US008698812B2

(12) United States Patent  
Callway et al.

(10) Patent No.: US 8,698,812 B2
(45) Date of Patent: Apr. 15, 2014

(54) VIDEO DISPLAY MODE CONTROL

(75) Inventors: Edward G. Callway, Toronto (CA); David Glen, Toronto (CA); Andrew Gruber, Arlington, MA (US); Gaurav Arora, Northborough, MA (US); Philip Swan, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 814 days.

(21) Appl. No.: 11/833,533

(22) Filed: Aug. 3, 2007

(65) Prior Publication Data

US 2008/0088635 A1    Apr. 17, 2008

Related U.S. Application Data

(60) Provisional application No. 60/835,620, filed on Aug. 4, 2006.

(51) Int. Cl.  
*G06F 15/00* (2006.01)

(52) U.S. Cl.  
USPC ............................ 345/501; 345/522; 345/581

(58) Field of Classification Search  
USPC .................... 725/74; 398/152; 348/14.1, 515; 345/204  
See application file for complete search history.

(56) References Cited

U.S. PATENT DOCUMENTS

| | | | |
|---|---|---|---|
| 6,278,478 B1 * | 8/2001 | Ferriere | 348/14.1 |
| 6,315,669 B1 | 11/2001 | Okada et al. | |
| 7,620,326 B2 * | 11/2009 | Glingener | 398/152 |
| 7,636,126 B2 * | 12/2009 | Mallinson | 348/515 |
| 2002/0163523 A1 * | 11/2002 | Adachi et al. | 345/536 |
| 2003/0081677 A1 | 5/2003 | Segman | |
| 2003/0161398 A1 * | 8/2003 | Feder et al. | 375/240.03 |
| 2004/0145582 A1 * | 7/2004 | Mehta et al. | 345/204 |

(Continued)

FOREIGN PATENT DOCUMENTS

| | | | |
|---|---|---|---|
| JP | 2005338605 A | 12/2005 | |
| JP | 2006178425 A | 7/2006 | |
| WO | WO 2006020560 | * 2/2006 | H04N 9/00 |

OTHER PUBLICATIONS

International Search Report for International Application No. PCT/US2007/017567; from European Patent Office; dated Jan. 18, 2008.
First Office Action for Chinese Application No. 200780033785.0, filed Mar. 12, 2009, State Intellectual Property Office of People's Republic of China, Office Action issued Jul. 5, 2010.
Abstract of Chinese Publication No. CN1812511, Jin Renxun Li, Aug. 2, 2006.

(Continued)

*Primary Examiner* — Phi Hoang  
(74) *Attorney, Agent, or Firm* — Faegre Baker Daniels LLP

(57) ABSTRACT

A video graphics chip includes a graphics module configured to process incoming video information in accordance with different modes to produce a video output signal and to transmit the video output signal toward a display screen for rendering of video corresponding to the video information, and a display mode module coupled to the graphics module configured to analyze the incoming video information to determine a type of video associated with the incoming video information and to send a video mode indication of a preferred video processing mode for the incoming video information to the graphics module, where the graphics module is configured to process the incoming video information in accordance with a selected mode from the plurality of different modes based on the video mode indication received from the display module.

23 Claims, 5 Drawing Sheets

(56) References Cited

U.S. PATENT DOCUMENTS

| | | |
|---|---|---|
| 2005/0066066 A1 | 3/2005 | Karaoguz et al. |
| 2005/0099437 A1 | 5/2005 | Kim et al. |
| 2006/0015911 A1* | 1/2006 | Dean .............................. 725/74 |
| 2006/0205507 A1* | 9/2006 | Ho ................................. 463/39 |
| 2006/0227237 A1* | 10/2006 | Kienzle et al. ................ 348/343 |
| 2006/0238649 A1* | 10/2006 | Brown Elliott et al. ...... 348/441 |
| 2006/0251389 A1* | 11/2006 | Kim ................................ 386/83 |
| 2007/0115435 A1* | 5/2007 | Rosendaal ...................... 353/30 |
| 2007/0223874 A1* | 9/2007 | Hentschel ...................... 386/89 |

OTHER PUBLICATIONS

Second Office Action for Chinese Application No. 200780033785.0, filed Mar. 12, 2009, State Intellectual Property Office of People's Republic of China, Office Action issued Mar. 9, 2011.

Japanese Patent Office, "Office Action" mailed Nov. 5, 2013, in related Japanese Application No.: 2009-522902 (partial translation).

\* cited by examiner

VIDEO DISPLAY MODE CONTROL

CROSS-REFERENCE TO RELATED APPLICATIONS

This application claims any and all benefits as provided by law of U.S. Provisional Application No. 60/835,620 filed Aug. 4, 2006 which is hereby incorporated by reference in its entirety.

STATEMENT REGARDING FEDERALLY SPONSORED RESEARCH

Not Applicable

REFERENCE TO MICROFICHE APPENDIX

Not Applicable

BACKGROUND OF THE INVENTION

Different forms of video are presently available in today's society. For example, video can be used for television shows and movies, but also video games. The different forms of video can be processed differently to optimize or improve the presentation of the video, e.g., based on priorities associated with the video forms. For example, for video games, preferably a short delay in displaying the video is often desired as many video games involve quick and frequent input by a user/player. Conversely, for television shows or movies, a relatively long delay is often acceptable to provide for improved accuracy and/or resolution of the images displayed. The video may be provided by a variety of sources such as cable/satellite boxes, terrestrial broadcast tuners, VCRs, DVD players, game consoles, and computers. Further, video information can be rendered by a variety of devices, including telephones, music players (e.g., compact disc players, MP3 players, etc.), and televisions.

Currently, some television sets, e.g., digital television (DTV) sets, support multiple display modes. Such modes include game mode and DVD mode. A user can manually select which mode to use for displaying video content.

SUMMARY OF THE INVENTION

In general, in an aspect, the invention provides a video graphics chip including a graphics module configured to process incoming video information in accordance with different modes to produce a video output signal and to transmit the video output signal toward a display screen for rendering of video corresponding to the video information, and a display mode module coupled to the graphics module configured to analyze the incoming video information to determine a type of video associated with the incoming video information and to send a video mode indication of a preferred video processing mode for the incoming video information to the graphics module, where the graphics module is configured to process the incoming video information in accordance with a selected mode from the plurality of different modes based on the video mode indication received from the display module.

Various aspects of the invention may provide one or more of the following capabilities. A video processing mode (with corresponding video delay and rendering accuracy) can be set and/or adjusted in accordance with a type of video received and/or a user preference. A video processing mode may be set automatically. A video processing mode may be set manually, including overriding an automatically-set mode. Low video processing delay can be selected for input gaming video. High video rendering accuracy can be set for standard, non-gaming, video.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for selection, especially automatic selection, of video display modes. Incoming signals (e.g., video, audio) can be analyzed for characteristics that can help distinguish different video input, e.g., video games vs. standard video (e.g., television shows or movies). The incoming signals can be analyzed for, e.g., indications of the type of video (e.g., indicated in a sideband signal), closed captioning, VBI data, watermarks, motion (correlated vs. random), horizontal and/or vertical pans, scene cuts, audio/video relationships, broadcast artifacts (e.g., RF modulation, digital transmission artifacts such as MPEG encoding, analog transmission artifacts), gaming characteristics, DVD characteristics (e.g., letterboxing), cadences, synch signals, values of video signal portions over time, warnings for imminent mode changes, and/or presence of Macrovision. Automatic selection could be confirmed, or overridden. Further, characterizations of video game graphics makers can be stored and compared against characteristics of incoming signals. Processing of incoming signals may be done differently to provide a more desirable video delay versus graphics quality combination. Other embodiments are within the scope of the invention.

Figure 1:
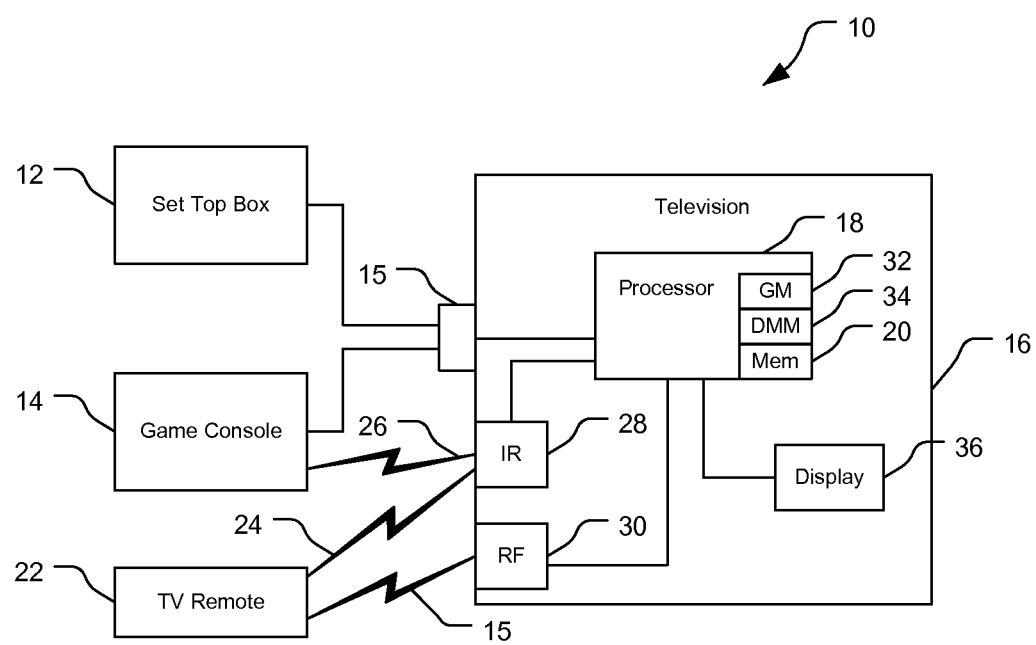
FIG. 1 is a block diagram of a multimedia entertainment system.

Referring to FIG. 1, a system 10 can include a set-top box 12, a video game console 14, and a video/audio processing and display device, here a television 16. The set-top box 12 and the game console 14 can be connected to the television 16 to send signals to the television 16. These signals can comprise standard video, e.g., television programs or movies, or video games. Typically, users want low video delay in video games and are willing to sacrifice video quality for low delay while wanting high quality for standard video such as TV programs or movies, or games with little or no rapid movement and for which low video delay is not critical to use of the game. The television 16 can include a processor 18 that can be disposed on a semiconductor chip and that can include memory 20. The memory 20 can store computer-readable, computer-executable code that the processor 18 can read and execute to perform functions described herein to select how to process incoming signals, and to process them accordingly. In particular, the processor 18 can include a graphics module 32 for processing video signals for display on a display 36, in accordance with a current video processing mode. The processor 18 can also implement a display mode module 34 for determining, using incoming video/audio signals, control signals, and/or override signals, which video processing mode to implement. While the set-top box 12 and the game console 14 can be connected to different physical inputs, the signals received from either device 12, 14 may be for video games or other video types at any given time (e.g., because many video game consoles can also serve as Internet browsers, play DVDs, etc., and set-top boxes are not limited to providing only non-gaming video, referred to herein as standard video).

The television 16 can be configured to automatically determine whether incoming signals are for a video, e.g., television signal, or are for video games. The automatic selection may be based on one or more of a variety of factors/characteristics indicating what type of video the incoming video is, or is likely to be.

The television 16 is further configured to select a game or gaming video processing mode, or a standard video processing mode. The gaming mode has a low video delay in order to provide increased responsiveness for processing incoming video gaming signals. The standard video processing mode has a longer video delay and more signal processing (e.g., frame rate conversion) for non-gaming incoming signals, yielding higher quality images. Audio associated with incoming signals would be delayed in accordance with the video delay to help ensure video/audio synchronization. A user can be advised, e.g., by a message on the device 16, to route audio signals through the device 16 to help ensure equivalent audio and video delays, and thus audio/video synchronization. While the discussion below focuses on two modes, gaming and standard video, as discussed below, more than two video processing modes could be available. The device 16 can be configured to perform a variety of video processing actions, but for lower delay processing modes, to bypass one or more of the processing actions in accordance with the desired delay.

The television 16 can be further configured to receive a user's manual selection and/or confirmation of which video delay mode (e.g., high delay high quality versus low delay, less processing) to use. This selection/confirmation can be received via the set-top box 12 or the game console 14 via direct input (e.g., physical selection of a button on the television 16, or selection through a remote control 22 for the television 16).

The television 16 can be configured to analyze a sideband signal to automatically determine whether or not incoming signals are for gaming video where low video delay is desired. The connections between the video sources 12, 14 and the device 16 can include a separate control channel from providing control information for use in selecting a video processing mode. The control channel signal can include a specific indication from the source provider, such as a set-top box 12 or a game console 14, that the incoming signals are, for example related to standard video, graphics, or gaming. Also, the control channel signal can provide a warning that the type of video, or at least the desirable video delay mode, is about to change, is changing, or has changed.

The device 16 can further be configured to analyze the incoming video signals to determine a desired or preferred video processing mode. The processor 18 can detect and analyze portions of the signal, for example, VBI data, watermarks, etc. using heuristics to determine the desired or preferred processing mode. Confirmation of the determined video processing mode can be requested from the user. Thus, for example, if a video game is detected, the user can reject the use of low delay, low video processing if the video game being played is a slow-moving, high resolution game. The processor 18 can detect the existence of watermarks and analyze whether a watermark relates to a game (e.g., if the watermark corresponds to a watermark known to be associated with a game or game manufacturer), and select the appropriate processing mode.

The processor 18 can analyze the VBI data for closed captioning, and set the video processing mode for standard video if closed captioning is detected. The processor 18 can be configured to determine an average of how much closed captioning data is present in the incoming signal over time. If the average, determined over a gaming-to-video time, meets or exceeds a threshold for at least a gaming-to-video time, then the incoming signal is likely (and the processor 18 can determine that it is, or is likely) a standard video signal. The processor 18 can be configured to either automatically switch to the standard video mode in this case, or to provide a message to the user inquiring as to whether the user desires to change the video processing mode to standard video mode. The message to the user could be, e.g., "Non-gaming video has been detected. Would you like to employ non-gaming video processing?" Thus, the message can be more user-friendly than asking whether to use a low video delay or a high video delay. The processor 18 can be set, e.g., by the user, to either query the user for confirmation or not.

The processor 18 can also analyze the VBI data for closed captioning, and set (change to) the video processing mode for gaming video if a lack of closed captioning is detected. If the video mode is standard video, and the closed captioning data average, determined over a video-to-gaming time, is below a video-to-gaming data threshold, then the processor 18 determines that the incoming signal could be a video game. The video-to-gaming time is preferably longer than the gaming-to-video time as portions of standard video may not include closed captioning (e.g., during explosion or chase scenes). Also, the video-to-gaming threshold could be lower than the gaming-to-video threshold. The processor 18 can change to gaming mode, using the lack of closed captioning as at least a factor in the determination to change. As with changing from gaming to standard video processing modes, the user can, optionally, be queried as to whether to change video processing modes from standard video to gaming.

The processor 18 can detect motion characteristics of images provided by the incoming signals to determine which video processing mode is desirable. The processor 18 can characterize motion according one or more histograms relating types of motion and type of video. The processor 18 can determine image pan speed and direction, i.e., horizontal and vertical, and analyze this information in view of a multi-dimensional histogram to determine a desired video processing mode based on the frequency of horizontal and vertical pans over time. The processor 18 further can analyze whether image motion is correlated, with everything in the image moving similarly, or random, with a portion of the image moving differently than another portion. Further analysis of motion can be performed by the processor 18 to determine a frequency of scene cuts, with few scene cuts (low scene cut frequency) indicating a video game and frequent scene cuts indicating standard video. The processor 18 can use the motion characteristics as inputs to a heuristic that indicates, based on the inputs, whether the video is likely to be standard video or gaming video. The heuristic can be developed, e.g., by analyzing standard video and gaming video characteristics and determining what characteristics and sets of characteristics are more often associated with standard video versus gaming video.

The processor 18 can detect a change in video rendering characteristics to determine which video processing mode to use. For example, the processor 18 can determine that when the device 16 is in "progressive only," low delay, gaming mode and a non-compliant, interlaced, signal is received, processor 18 can responsively switch the video processing mode from gaming mode to standard video mode.

The processor 18 can detect and analyze relationships between video and audio provided by the incoming signals to determine which video processing mode is desirable. The processor 18 can characterize the audio-video relationship and compare this with a heuristic that indicates whether the incoming signal is more likely standard or gaming video. For example, if the incoming signals has flashes in the video that correspond with short, loud noises in the audio (e.g., bangs), then the heuristic will likely indicate that the incoming signal is gaming video for a user-responsive video game (e.g., a police, military, or other gunfire-related game). Further, repetitive background music may indicate that the incoming signal is more likely a gaming signal and thus the gaming mode may be preferred. Background music determination, however, may be combined with another determination before determining that gaming mode processing is preferred, as slow-moving video games, such as strategy games, may also employ background music, may be preferred to be viewed with standard video processing.

The processor 18 can further be configured to analyze the incoming signals for broadcast artifacts. These artifacts include radio frequency (RF) modulation, and digital transmission artifacts such as MPEG encoding or H.264 encoding. The RF modulation, and MPEG and H.264 encoding artifacts are typically associated exclusively with standard video, and thus if the processor 18 detects any of these artifacts, then the processor 18 can set the video processing mode to be, or suggest that the video processing mode should be, the standard video mode.

The processor 18 can analyze the incoming signals for IPB frame beat (I frame, P frame, B frame beat), mosquito noise, blocking artifacts, and/or quantization noise, which are all associated with MPEG encoding. For the IPB frame beat, the processor 18 can analyze the signals for the periodic (e.g., approximately every 15 frames) drop in quality associated with the periodic generation of a frame from scratch. For mosquito noise, the processor 18 can analyze the signals for quality degradation (noise) in flat signal portions adjacent to edges in the signals. To detect block artifacts, resulting from significant motion in an image and an encoder's inability to keep up and process completely this motion, can be detected by analyzing relationships of blocks in the image. The processor 18 can analyze the image to determine if blocks in (i.e., portions of) the image fail to align properly by detecting discontinuities between blocks. The block discontinuities can produce grid/boundary lines that the processor 18 can detect. Quantization noise occurs where there is a gradual change in the image that is not reflected within image blocks, but is reflected at the block boundaries, producing abrupt changes where a gradual change should occur. The processor 18 can detect the abrupt image changes at the block edges and determine that this is quantization noise and thus an indication that the incoming signal is standard video.

The processor 18 can analyze the incoming signals for analog broadcast transmission artifacts of Gaussian noise, vertical edge ringing, speckle noise, and herring bone noise. The processor 18 can detect Gaussian noise which is random, high frequency noise distributed over entire images. The processor 18 can detect the ringing associated with strong vertical image edges (i.e., significant image differences between horizontally adjacent image portions). Analog encoding is unable to show strong vertical edges which results in ringing (overshoot in signal value followed by declining error over time on either side of the desired signal value). The processor 18 can detect the ringing in the signal as an indication of standard video. Speckle noise results from interference from a specific source and results in very strong noise that is typically less widespread over the image than Gaussian noise. The processor 18 can detect speckle noise as an indication of standard video. The processor 18 can also detect herring bone noise, which is also caused by a specific interfering source. The processor 18 can detect herring bone noise, e.g., by monitoring for a specific frequency (e.g., using a frequency bank to decompose the signal) pervasively in images over time despite scene cuts, and that appears throughout an image, as an indication of standard video. The processor 18 is further configured to detect a loss of synch signal. In a broadcast signal, a loss of a synch signal equates to cuts to commercials, etc., while video games typically have a continuous, uninterrupted synch signal. Thus, if a loss of synch signal is detected, the processor 18 can conclude that the incoming video is likely to be standard video.

The processor 18 can also monitor parameters of incoming video signals to determine whether the incoming video signal is broadcast video or gaming video. The processor 18 can monitor blank level, synch tip level, color burst amplitude, color burst width (indicated by start and end), and setup level. If these parameters are constant (e.g., as indicated by a plot produced by the processor 18), then the processor 18 can conclude that the incoming video is likely to be gaming video. If these parameters are changing (e.g., due to interruption discontinuities), then the processor 18 can concludes that the incoming video is likely to be standard video.

The processor 18 is further configured to analyze the incoming signals for indicia of gaming video. In particular, the processor 18 can look for panning and/or audio/video correlation, zooming, scene cuts, presence of pervasive static image areas (e.g., static during scene changes, pans), sharpness of video, sideband signal provided by game source, and/or can measure subcarrier frequency accuracy. Significant panning of images can be associated by the processor 18 with gaming video, as can correlation between audio bursts and video flashes. Frequent zooms and lack of scene cuts can also associated by the processor 18 with gaming video. If one or more areas of the image are determined to be pervasively static through scene changes and/or pans, then the processor 18 can determine that the incoming signal is likely to be for a video game and thus appropriate for gaming mode processing. If the video is relatively sharp, and thus lacking in transmission artifacts and/or encoding artifacts that hinder image sharpness, then the processor can determine that the incoming video is likely to be gaming video. The processor 18 can also analyze sideband signals for indicia of gaming video. The processor 18 can also measure the subcarrier, used to encode color, frequency accuracy. If the frequency accuracy is very high, then the processor 18 can conclude that the signal is standard video while if the frequency accuracy is low, then the processor 18 can conclude that the signal is for gaming. For example, the processor 18 could monitor the variation between an expected frequency and the actual subcarrier frequency. For example, the processor 18 could compare the number of cycles in the subcarrier frequency over time with a system clock in the device 16 over time to determine the subcarrier frequency accuracy.

The processor 18 can also be configured to analyze the incoming signals for image characteristics indicative of DVDs. For example, the processor 18 can analyze the incoming signals for the presence of letterboxing, with the signal indicating to put black regions at the top and bottom of the image. If letterboxing is detected, the processor 18 can conclude that the incoming signal is standard video. Further, the processor 18 can analyze the incoming signal for MPEG encoding artifacts as discussed above, which are associated with DVD signals.

The processor 18 can also be configured to IR signals 26, 24 from the TV remote 22 and the game console 14, respectively, through the IR sensor 28. The processor 18 can monitor the IR activity to make decisions regarding the video processing to be performed. If received IR signals include IR codes known to be from game console controllers (e.g., in accordance with standards for such signals), then the processor 18 can conclude that the video signals received at the input 15 are gaming video signals and thus will implement the gaming mode. The processor 18 can also analyze received IR signals in combination with received video signals to determine correlation between the IR signals and the video. If commands in the IR signals correspond in time with scene cuts, then the processor 18 can conclude that the incoming IR commands are actuating channel changes, and thus can conclude that the incoming video is likely to be standard video. If commands in the IR signals correlate in time with motion (e.g., panning) or brightness (e.g., flashes) in the video image, but not often scene cuts, then the processor 18 can conclude that the incoming video is likely to be gaming video. Further, if the processor 18 determines that there is an absence of incoming IR signals over a threshold time, then the processor 18 can conclude that the incoming video is likely to be gaming video. If the processor 18 detects incoming RF signals at the RF input 30, then the processor 18 can conclude that the incoming video is, or likely is, gaming video.

The processor 18 can also be configured to serve as a cadence detector. As a cadence detector, the processor 18 can analyze incoming video signals for patterns related to broadcasts, including films and animation. For example, standard video typically has 60 frames per second while animation typically has much fewer than 60 frames per second, as does film, such as 24 frames per second. Thus, if frame rates much lower than 60 frames per second are detected, especially for significant durations (e.g., longer than a threshold such as three seconds), then the processor 18 can conclude that the incoming video should be processed in standard video mode. For gaming video, the video rate sometimes vary due to variances in the time used to render an image, but are often at 60 frames per second 100%, or nearly 100%, of the time, with short deviations to lower frame rates. Thus, if a frame rate of 60 frames per second is consistently detected, or is detected with lower frequency rates detected for brief durations (e.g., less than a threshold such as two seconds, then the processor 18 can conclude that the incoming video should be processed in gaming video mode.

The processor 18 can further detect the presence of Macrovision signals in the incoming video signals. The processor 18 can detect Macrovision-indicative effects such as false pulses and Macrovision-specific color burst characteristics, and can conclude that the incoming video signals are likely to be standard video. For example, the processor 18 can be configured in accordance with the teachings of U.S. Pat. No. 6,356,704 for detecting Macrovision signals.

The device 16 can include an override, such as for karaoke, to select gaming mode for standard video input signals. The processor 18 can receive an override signal and be responsive to this override signal to select the low-delay mode, here gaming mode, even if the processor 18 has determined that the incoming video signals are standard video signals. An override could be invoked for purposes other than karaoke.

Furthermore, processor 18 can compare characteristics of the incoming signals with characteristics of known game console and/or game graphics device makers. The memory 20 stores characteristics of signals associated with game console makers and graphics device (e.g., graphics cards) makers. Furthermore, the device 16 can be configured such that this information can be stored originally, and/or updated by downloading characteristics and associated content type (e.g., standard video versus gaming video) through a communications connection 32, e.g., connected to a communications network such as the Internet. The processor 18 can be configured to determine relevant characteristics of the incoming video signals and compare these with the known characteristics stored in the memory 20 and conclude that the incoming signals are likely gaming video signals if the incoming signal characteristics are similar to, or identical to, the stored characteristics associated with signals produced by a gaming console or game graphics device.

Figure 2:
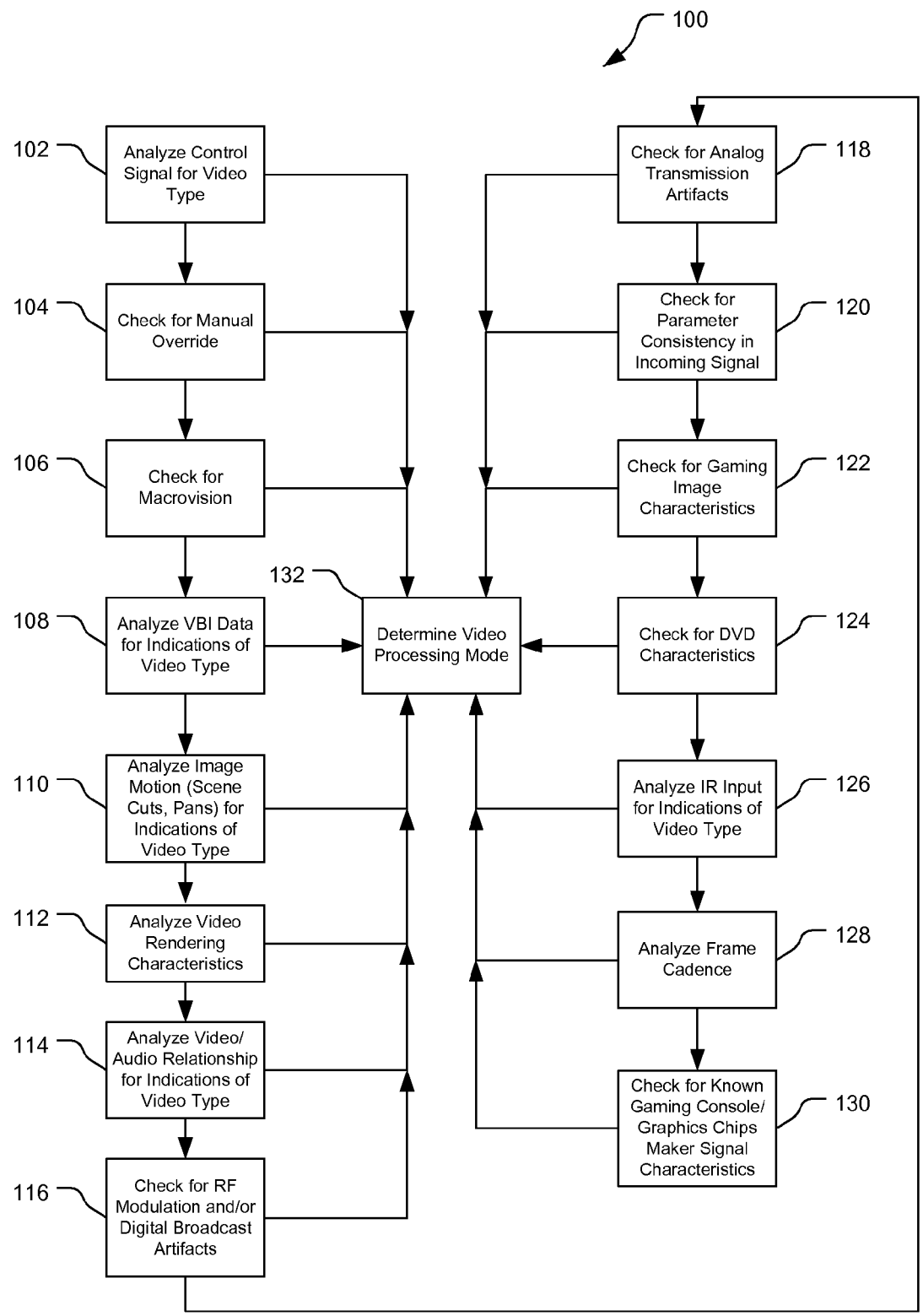
FIG. 2 is a block flow diagram of a process of determining a video processing mode for a television shown in FIG. 1.

In operation, referring to FIG. 2, with further reference to FIG. 1, a process 100 for determining and setting a video processing mode using the system 10 includes the stages shown. The process 100, however, is exemplary only and not limiting. The process 100 may be altered, e.g., by having stages added, removed, or rearranged.

Initially the processor 18 queries whether there are dedicated lines for gaming video versus standard video. If there are dedicated inputs for gaming standard video, then the processor 18 does not need to analyze the incoming signals to determine what processing mode to use. The processor 18 can implement the gaming mode if signals are received on the gaming input and can implement the standard video processing mode if signals are being received on the standard video input. The processor 18 can select which of the two inputs to use, e.g., in response to user override input, if signals are being received on both the gaming input and the standard video input.

At stage 102, the processor can analyze a control signal for indications of the input video type. Here, the processor 18 can receive input video signals on a line that is not dedicated to one particular video processing mode. The processor 18 can analyze the control signal, that may be present on the video input line or on a separate control signal line, and can analyze this signal for command indications of a video type. The indication can be, e.g., a bit string that is indicative of one mode versus the other.

At stage 104, the processor 18 checks for manual override of the default video processing mode or a control-signal-indicated video processor mode. The user can select the video processing mode manually (i.e., direct physical contact with the display 16), or through signals provided to the television 16 to override a default video processor mode implemented by the processor 18 or otherwise indicated by the control signal as determined in stage 102. The processor 18 can cycle through various video processing modes (here, alternating between standard and gaming mode) and ask the user to select or confirm the desired mode based on displayed images produced using the various modes. If an override is received, the processor 18 implements the selected video processing mode regardless of other input indications.

At stage 106, if the processor 18 checks for the existence of Macrovision® information on the incoming video signal. If the processor 18 detects the presence of Macrovision in the incoming signal, the processor 18 implements the standard video processing mode.

If at stages 104 or 106, the processor 18 receives or determines that there is a manual override selection of the video processing mode, or that Macrovision information exists in the incoming signal, then the process 100 proceeds to stage 132 where the processor 18 determines the video processing mode and no further stages of the process 100 are preformed. The process 100, however, is re-run periodically even if an override or Macrovision is detected.

If the video processing mode is not determined by any of the stages 102, 104, 106, conclusively, then the process 100 proceeds to further stages of the process 100, with information determined at the further stages being provided for further analysis, possibly collectively, for determination of the video processing mode at stage 132.

At stage 108, the processor 18 can analyze the VBI data for indications of video type of the incoming signal. The processor 18 can analyze the VBI data for the presence or absence of closed captioning. If closed captioning is found and an average amount of closed captioning meets or exceeds a gaming-to-video threshold as determined over a gaming-to-video time, then the processor 18 can set or change the video processing mode to the standard video mode. If the processor 18 determines that the video closed captioning average is below a video-to-gaming threshold as determined over a video-to-gaming time, then the processor 18 can set or change the video processing mode to the gaming video mode. Stage 108 is discussed more fully below with respect to FIG. 3.

At stage 110, the processor 18 analyzes motion in the images corresponding to the video signal for indications of the video type. The processor 18 can analyze the image motion for scene cuts, vertical pans, and horizontal pans. The information regarding the image motion such as whether the entire image moves uniformly and the frequency of pans and cuts is provided for further analysis in conjunction with other information to determine at stage 132 what video processing mode should be used.

At stage 112, the processor 18 can analyze the video rendering characteristics to determine which processing mode to use. The processor 18 can determine whether the video rendering characteristics are indicative of progressive only, low delay, gaming mode, or for interlaced processing. The processor 18 can indicate to the user that the video processing mode should be changed to the standard video mode from the gaming mode or vice versa based on these data.

At stage 114, the processor 18 analyzes the video and audio relation for indications of the video type. The processor 18 can determine, for example, that small flashes in the video correspond with audio bursts and indicate that the incoming video is more likely to be a video game in response to this conclusion. The processor 18 can also look for whether pervasive background music exists and if so indicates that the appropriate video processing mode is likely to be the gaming mode.

At stage 116, the processor 18 analyzes the incoming video for RF modulation and/or digital broadcast artifacts. The processor 18 can analyze the incoming signal for indications of RF modulation and MPEG encoding or H.264 encoding. If the processor 18 detects the presence of any of these characteristics, then the processor 18 can set the video processing mode to the standard video processing mode. The processor 18 can further analyze the incoming signal for IPB frame beat, mosquito noise, blocking artifacts, and/or quantization noise. Depending on the existence of these artifacts, and the amount of the artifacts detected, the processor 18 can provide information for use in stage 132 to influence the likelihood of determining that the video processing mode should be standard video processing. Further, if the processor 18 determines that the amount of such artifacts are conclusive, then the processor 18 can determine that performance of further stages of the process 100 are unnecessary, although the process 100 could, however, repeat as discussed above.

Stage 116 can be performed in a different order/position than as shown in FIG. 2. For example, stage 116 can be performed before stage 108, with further stages not preformed if the RF modulation or digital broadcast artifacts are detected, or if artifacts conclusively indicate the appropriate video processing mode. The process 100 can repeat, e.g., after a threshold amount of time to accommodate or implement the appropriate video processing mode if the incoming video type changes.

At stage 118, the processor 18 can check for analog transmission artifacts in the incoming video signal. The processor 18 can analyze the incoming signal for, e.g., Gaussian noise, vertical edge ringing, speckle noise, and herringbone noise. Again, the processor 18 can indicate that the video processing mode should be the standard video processing mode if the existence of the analog transmission artifacts is conclusive as to the incoming video type. Otherwise, the processor 18 can provide information indicating that the input is likely to be standard video and, and to what degree, or that no or little analog transmission artifacts have been detected. As with stage 116, stage 118 can be performed elsewhere in the process 100, e.g., before stage 108.

At stage 120, the processor 120 can check for parameter consistency in the incoming signal. The processor 18 can monitor the blank level, synch tip level, color burst amplitude, color burst width, and set up level of the incoming signal. The processor 18 can indicate whether these parameters are constant, with constant parameters indicating that the incoming signal is likely to be gaming video, and likely to be standard video otherwise.

At stage 122, the processor 18 can check the incoming signal for gaming video characteristics. The processor 18 can analyze the images of the incoming video signal for panning, audio/video correlation, zooming, scene cuts, presence of pervasive static image areas, sharpness of video, sideband signal, and/or subcarrier frequency accuracy. The processor 18 can provide information for use in stage 132 for determining the video processing mode. This information can include indications of presence and amounts and/or frequency of such characteristics and whether the image characteristics indicate or suggest that the incoming video signal was likely to be gaming versus standard video. If the video is sharp, the subcarrier frequency accuracy is low, there is frequent panning, audio/video correlation, and/or zooming, and/or infrequent scene cuts, and/or pervasive status image areas, then the processor 18 can indicate that the video signal is likely to be gaming video and/or provides indicia of such frequencies and/or other characteristics.

At stage 124, the processor 18 can analyze the incoming video signal for DVD characteristics. If the processor 18 finds DVD characteristics in the image, the processor 18 can indicate that, or provide information for use in stage 132 to determine that, the incoming signal is likely to be standard video.

At stage 126, the processor 18 can analyze infrared input for indications of video type of the incoming video signal received concurrently with the incoming infrared signal(s). The processor 18 can correlate incoming infrared commands with the video. If the image has scene cuts corresponding with incoming infrared commands, then the processor 18 can provide information, for use in stage 132, indicating that the video is likely to be standard video. If the incoming IR signals correlate in time with motion or brightness in the video image but not scene cuts, then the processor 18 can indicate that the incoming video signal is likely to be gaming video. Stage 126 is discussed more fully below with respect to FIG. 4.

At stage 128, the processor 18 can analyze the frame cadence of the incoming video signal. If the processor 18 determines that the incoming video frame rate is at or near 60 frames per second for a large portion of a sample window, then the processor 18 can indicate that the incoming video is likely to be gaming video. If the processor 18 determines that the frame rate is below 60 frames per second for a significant period of time, then the processor 18 can indicate that the incoming video is likely to be standard video.

At stage 130, the processor 18 can check for known signal characteristics of gaming console/graphic chips makers. The processor 18 can analyze the incoming signal to determine characteristics of the signal relevant to characteristics that are associated with particular graphics chips makers or gaming console makers. The processor 18 can compare the relevant characteristics (e.g., existence and/or values of parameters) with stored sets of characteristics of known/quantified graphics chips and/or gaming consoles. If the comparison yields high similarity between the analyzed characteristics and a set of stored characteristics, then the processor 18 can indicate that the incoming video is likely to be gaming video.

At stage 132, the processor 18 can collectively analyze information determined at other stages of the process 100 to determine and set the video processing mode. The various pieces of data can be weighted by the processor 18 and analyzed to determine whether it is more likely that the incoming video is standard video or gaming video. The processor 18 can set or change the video processing mode to the mode determined to be more likely to be appropriate for the incoming video signal. If any of the analysis done in the other stages of the process 100 are conclusive of the incoming video type, then the processor 18 can avoid or omit performing the analysis of the likelihood indications and implement the video processing mode according to the video type conclusively determined at the appropriate stage.

The process 100 can repeat to account for changes in the incoming video type. For example, the process 100 can repeat periodically, or anytime when there is a break longer than a threshold amount of time in the incoming signal. Thus, if the incoming signal is terminated for longer than the threshold, and then new information is received, then process 100 can be performed at that time.

Figure 3:
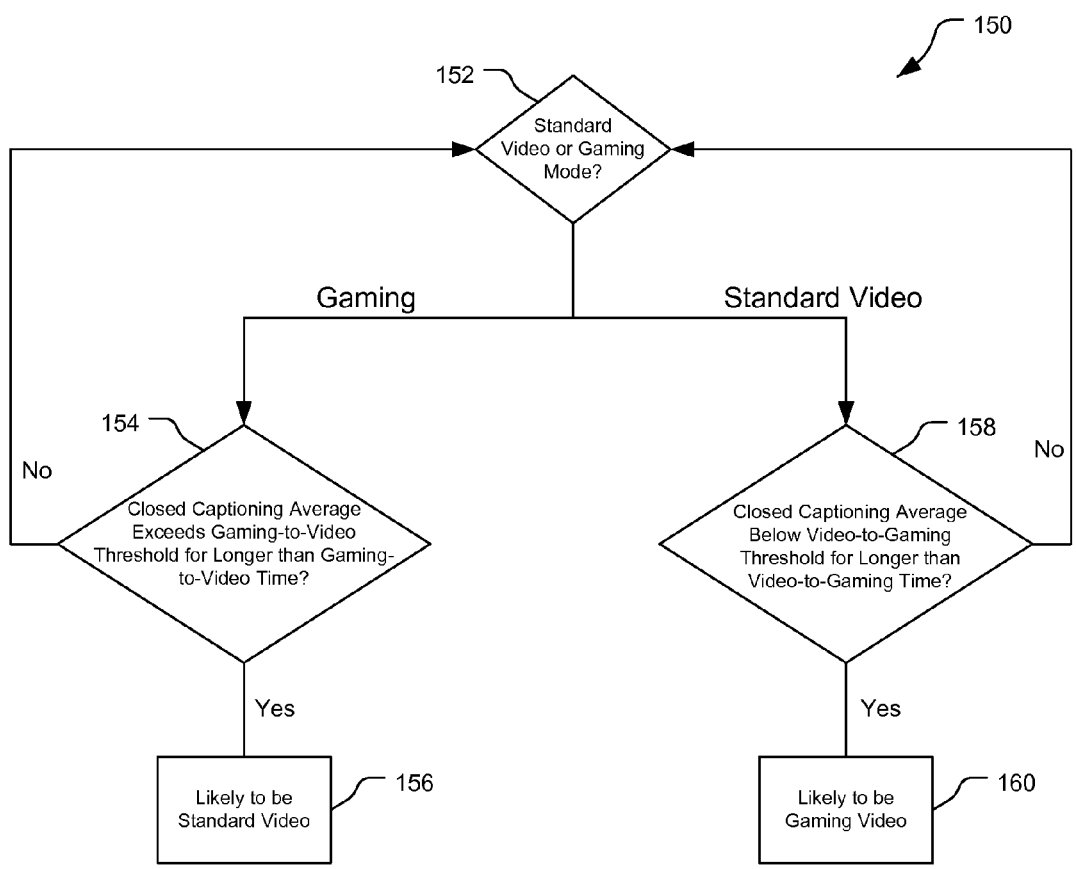
FIG. 3 is a block flow diagram of a process of determining whether incoming video signals are likely to be for standard video or gaming video based upon amount of closed captioning information in the signals.

Referring to FIG. 3, with further reference to FIGS. 1-2, a process 150 for determining and setting a video processing mode based upon presence or absence of closed captioning, e.g., for stage 108 of FIG. 2, using the system 10 includes the stages shown. The process 150, however, is exemplary only and not limiting. The process 150 can be altered, e.g., by having stages added, removed, or rearranged.

At stage 152, the processor 18 can determine whether the current video processing mode is standard video mode or gaming mode. If the processor 18 determines that the current mode is gaming mode, then the process 150 can proceed to stage 154, and otherwise proceed to stage 158.

At stage 154, the processor 18 can analyze the VBI data for the existence of closed captioning data above an average amount for longer than a threshold time. The processor 18 can determine whether closed captioning exists within the VBI data and monitors the amount of closed captioning if it does exist. The processor 18 can further average the closed captioning data over time. If the processor 18 determines that the amount of closed captioning data on average over a gaming to video threshold time exceeds a gaming to video threshold closed-captioning amount, then the process 150 can proceed to stage 156 and otherwise returns to stage 152. At stage 156, the processor 18 can provide an indication that the incoming video is likely to be standard video which will likely result in the video processing mode being switched to standard video mode at stage 132 of FIG. 2.

At stage 158, the processor 18 can analyze the average amount of closed captioning data over a video to gaming threshold time. If the processor 18 determines that the average amount of closed captioning data is below a video to gaming threshold amount for longer than the video to gaming threshold time, then the process 150 can proceed to stage 160 and otherwise returns to stage 152. At stage 160, the processor 18 can provide an indication that the incoming video is likely to be gaming video, which will likely result in the video processing mode being set to the gaming mode at stage 132 of FIG. 2.

Figure 4:
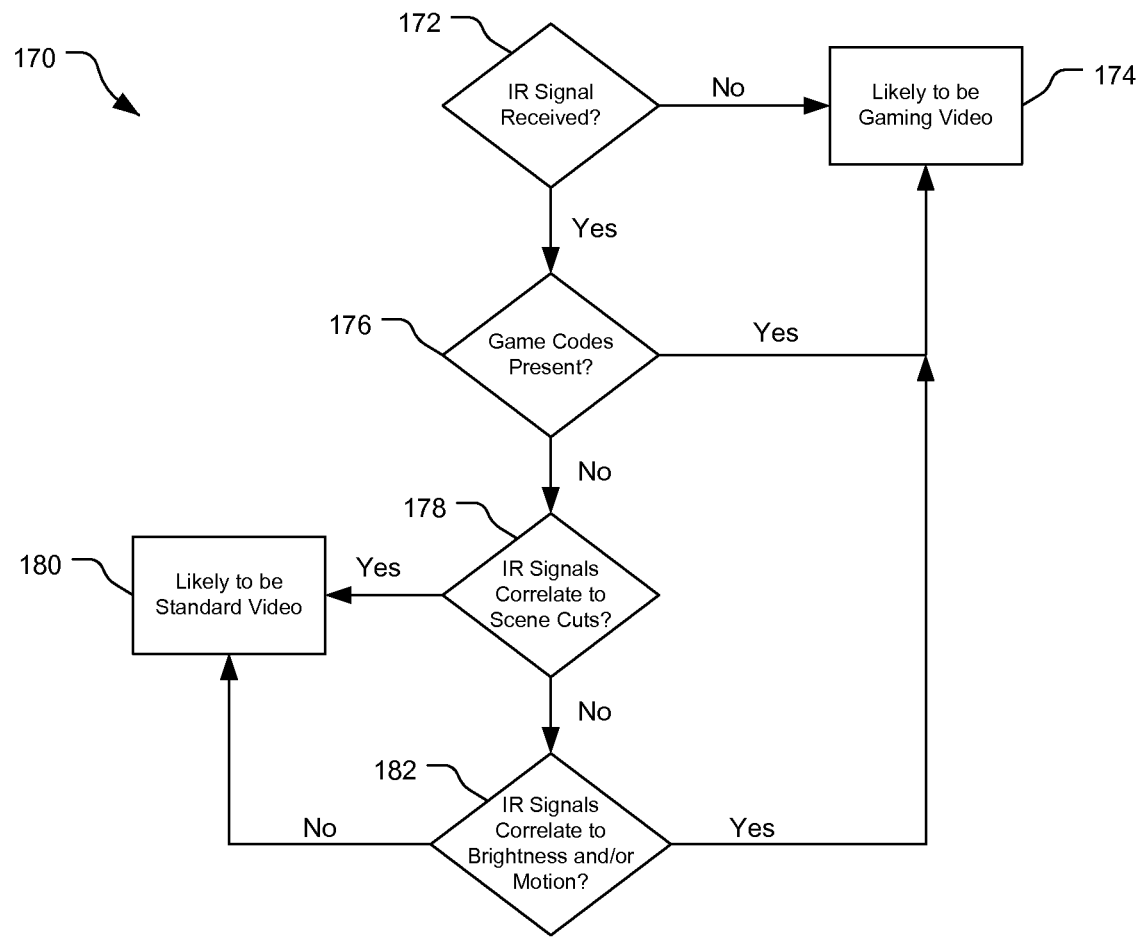
FIG. 4 is a block flow diagram of a process of determining whether incoming video signals are likely to be for standard video or gaming video based upon correlation of incoming infrared signals and video effects in the signals.

Referring FIG. 4, with further reference to FIGS. 1-2, a process 170 for determining whether an incoming video signal is likely to be standard video or gaming video based on an analysis of incoming IR signals and using the system 10 includes the stages shown. The process 170, however, is exemplary only at not limiting. The process 170 can be altered, e.g., by having stages added, removed, or rearranged.

At stage 172, the processor 18 can determine whether an IR signal is received. The processor 18 can monitor the IR sensor 28 for indications of incoming IR signals or commands. If no incoming IR signals are indicated by the IR sensor 28, then the process 170 can proceed to stage 174 where the processor 18 can determine that the incoming video is likely to be gaming video and can provide an indication of such. If, however, the processor 18 determines that an IR signal is received, then the process 170 can proceed to stage 176.

At stage 176, the processor 18 can determine whether game codes are present in the received IR signals. The processor 18 can analyze the incoming IR signals for the presence of codes known to be associated with or to be from, game console controllers. If such codes exist in the incoming IR signals, then the process 170 can proceed to stage 174, and otherwise proceed to stage 178.

At stage 178, the processor 18 can determine whether the incoming IR signals correlate to scene cuts of images in the incoming video signal. If the IR signals, in particular commands within those signals, correlate to scene cuts frequently (e.g., channel changes), then the process 170 can proceed to stage 180 where the processor 18 can determine that the incoming video is likely to be standard video and provides an indication of such. If the processor 18 however, determines that the IR signals do not correlate to scene cuts frequently enough, then the process 170 can proceed to stage 182.

At stage 182, the processor 18 can determine whether the incoming IR signals correlate to brightness and/or motion in the video images. If the processor 18 determines that the incoming IR signals, and more particularly commands within the signals, do not correlate to, e.g., flashes of brightness, and/or to motion within the video images, then the process 170 can proceed to stage 180. If, however, the processor 18 determines that the IR signals do correlate frequently to brightness (such as flashes) and/or motion of the video images (e.g., panning), then the process 170 can proceed to stage 174.

Figure 5:
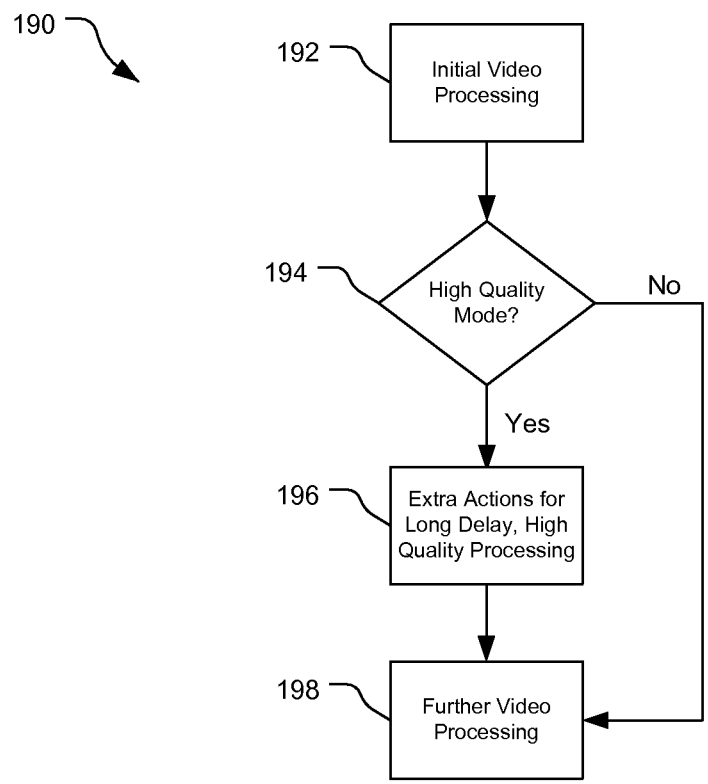
FIG. 5 is a block flow diagram of a process of processing incoming video signals in accordance with different video processing modes.

Referring to FIG. 5, with further reference to FIGS. 1-2, a process 190 for processing the incoming video information in a video/audio signal includes the stages shown. The process 190, however, is exemplary and not limiting. The process 190 can be altered, e.g., by having stages added, removed, or rearranged.

At stage 192, the processor 18 can perform initial video processing on the video information. This initial video processing can include actions to be performed on the video information regardless of the video processing mode in which the processor 18 is operating.

At stage 194, an inquiry can made as to the processing mode in which processor 18 is operating. The processor 18 can determine whether the current video processing mode is a low delay, low processing mode or a higher delay, higher processing mode. If the current video processing mode is the low delay, low video processing mode, then the process 190 can proceed to stage 198. If the current video processing mode, however, is a higher delay, higher video processing mode, then the process 190 can proceed to stage 196.

At stage 196, the processor 18 can perform additional video processing actions. The processor 18 can perform video processing actions in accordance with the current video processing mode. The processor 18 can implement one or more higher delay, higher video processing modes. At stage 196, the processor 18 can perform the actions appropriate for the current video processing mode.

At stage 198, the processor 18 can perform any additional processing actions appropriate for the current video processing mode. In this stage, the processor 18 can perform actions common to the various video processing modes that are preferably performed after any video processing actions taken in stage 196.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

The configuration of inputs to a display, e.g., a television, can be adapted for specific types of video. For example, one input to the display for connecting to a game console can be configured to have a short delay, with relatively less video processing, while another input for connecting to, e.g., a cable box, can be configured to have a longer delay, with relatively more video processing. The configuration of the inputs can be stored in non-volatile memory in the display. One or both of the inputs can be configured to tolerate different types of signals than those expected, or to change signal type, and thus the default delay and processing can be overridden, e.g., by manual input from a user and/or automatically in response to detection of the video type.

The user can be provided with, or allowed to select to see, the incoming video rendered using different video processing modes. The display can automatically, or in response to a user selection, render the incoming video using gaming mode at one time and using standard video mode at another time. The modes can be cycled repeatedly. The user can evaluate which mode the user prefers, and select that mode such that the display will implement that mode regardless of the type of video. Alternatively, the display can implement the selected mode until the display detects a change in video type. In response to detecting the change in video type, the display can, e.g., automatically change the processing mode as appropriate, query the user as to whether the user desires to change video processing mode, or prompt the user to select to cycle the processing mode and select a desired mode.

Further, more video processing modes than just gaming mode and standard video mode can be available in the display. Other modes can be provided with different processing delay and quality tradeoffs. Thus, the display can automatically, or the user could manually, choose a desired mode yielding a desired compromise between video processing quality and video processing delay.

The display can adjust a frame rate conversion (FRC) algorithm based upon a selected delay/processing tradeoff. For processing modes with relatively less delay, relatively more conservative FRC decisions can be implemented. For example, for low delay processing modes, drop/repeat FRC could be implemented while at higher delays, a motion-compensated FRC algorithm could be used.

The user can be queried to select a video processing mode to, at least initially, associate with an input. The user can select the gaming mode or the standard video mode as a default for a given input to a display. The query can be made, e.g., in response to first detecting information on an input to the display.

Further, while the description above refers to "the invention," more than one invention may be disclosed.

What is claimed is:

1. A video graphics chip comprising:
a graphics module configured to produce a video output signal from an incoming moving video signal comprising a sequence of different video images and an incoming audio signal, in accordance with one of a gaming mode and a standard mode, and to transmit said video output signal toward a display screen for rendering of the video images carried in said video output signal, wherein:
in said gaming mode, said graphics module is configured to produce an enhanced sequence of moving images by executing a first set of processing tasks on the incoming moving video signal; and
in said standard mode, said graphics module is configured to produce an enhanced sequence of moving video images by executing a second set of processing tasks on the incoming moving video signal, wherein said second set of processing tasks is larger than said first set of processing tasks, with relatively more delay; and
a display mode module coupled to said graphics module configured to analyze said sequence of different video images in said incoming moving video signal to determine a type of video associated with said incoming moving video signal, wherein said determining comprises detecting indicia of gaming video, and to send a video mode indication of a preferred video processing mode for said incoming moving video signal to said graphics module;
wherein said graphics module is configured to produce said video output signal in accordance with one of said gaming mode and said standard mode based on said video mode indication received from said display mode module.

2. The video graphics chip of claim 1, wherein said analyzing said sequence of different video images to determine said type of video associated with said incoming moving video signal further comprises analyzing motion characteristics of said video images.

3. The video graphics chip of claim 2, wherein said analyzing said motion characteristics comprises detecting said motion characteristics and wherein said determining said type of video is based on a heuristic relating motion characteristics and types of video.

4. The video graphics chip of claim 3, wherein said motion characteristics comprise one or more of: frequency of horizontal panning over time, frequency of vertical panning over time, level of correlation of image motion, frequency of scene cuts, zooming, and presence of pervasive static image areas.

5. The video graphics chip of claim 1, wherein said analyzing said sequence of different video images to determine said type of video associated with said incoming moving video signal comprises analyzing relationships between said sequence of different video images carried in said incoming video signal and audio sounds carried in said incoming audio signal.

6. The video graphics chip of claim 5, wherein said analyzing said relationships between said sequence of different video images and said audio sounds comprises characterizing a relationship between said sequence of different video images and said audio sounds and comparing said relationship with a heuristic relating audio-video relationships and types of video.

7. The video graphics chip of claim 6, wherein said relationship between said sequence of different video images and said audio sounds comprises a level of correspondence in time between video flashes and audio bursts.

8. The video graphics chip of claim 1, wherein said graphics module is further configured to process incoming infrared signals, and said analyzing said sequence of different video images to determine said type of video associated with said incoming moving video signal further comprises analyzing relationships between said sequence of different video images carried in said incoming moving video signal and said incoming infrared signals.

9. The video graphics chip of claim 8, wherein said relationship between said sequence of different video images and said audio sounds comprises one or more of: correspondence in time between infrared signals and scene cuts, correspondence in time between infrared signals and motion, correspondence in time between infrared signals and video flashes, and absence of incoming infrared signals over a threshold time during which video images are displayed.

10. A multimedia entertainment system comprising:
at least one video input configured to receive an incoming moving video signal comprising a sequence of different video images;
a display configured to render video images; and
a processor coupled to the at least one video input, and to the display, the processor configured to produce a video output signal from an incoming moving video signal comprising a sequence of different video images in accordance with one of a gaming mode and a standard mode, and to transmit said video output signal to the display for rendering of said sequence of different video images by the display, wherein:
in said gaming mode, said processor is configured to produce an enhanced sequence of moving images by executing a first set of processing tasks on the incoming moving video signal; and
in a standard mode, said processor is configured to produce an enhanced sequence of moving video images by executing a second set of processing tasks on the incoming moving video signal, wherein said second set of processing tasks is larger than said first set of processing tasks, with relatively more delay;
wherein the processor is configured to analyze said sequence of different video images to determine a type of video associated with said incoming moving video signal, wherein said determining comprises detecting indicia of gaming video and to select, based on said type of video, a preferred video processing mode from said plurality of different modes for said incoming moving video signal, said processor configured to perform relatively more video processing on said incoming moving video signal, with relatively more video delay, in said standard video mode relative to said gaming video mode to provide lower video delay and increased responsiveness for video gaming in said gaming mode.

11. The multimedia entertainment system of claim 10, wherein said analyzing said sequence of different video images to determine said type of video associated with said incoming moving video signal further comprises analyzing motion characteristics of said video images.

12. The multimedia entertainment system of claim 11, wherein said analyzing said motion characteristics comprises detecting said motion characteristics and wherein said determining said type of video is based on a heuristic relating motion characteristics and types of video.

13. The multimedia entertainment system of claim 12, wherein said motion characteristics comprise one or more of: frequency of horizontal panning over time, frequency of vertical panning over time, level of correlation of image motion, frequency of scene cuts, zooming, and presence of pervasive static image areas.

14. The multimedia entertainment system of claim 10 further comprising at least one audio input configured to receive an incoming audio signal, wherein said processor is coupled to said at least one audio input and is further configured to process said incoming audio signal, and said analyzing said sequence of different video images to determine said type of video associated with said incoming moving video signal comprises analyzing relationships between said video images carried in said incoming moving video signal and audio sounds carried in said incoming audio signal.

15. The multimedia entertainment system of claim 14, wherein said analyzing said relationships between said sequence of different video images and said audio sounds comprises characterizing a relationship between said sequence of different video images and said audio sounds and comparing said relationship with a heuristic relating audio-video relationships and types of video.

16. The multimedia entertainment system of claim 15, wherein said relationship between said sequence of different video images and said audio sounds comprises a level of correspondence in time between video flashes and audio bursts.

17. The multimedia entertainment system of claim 10 further comprising at least one infrared input configured to receive incoming infrared signals, wherein said processor is coupled to said at least one infrared input and is further configured to process said incoming infrared signals, and said analyzing said sequence of different video images to determine said type of video associated with said incoming video signal further comprises analyzing relationships between said sequence of different video images carried in said incoming moving video signal and said incoming infrared signals.

18. The multimedia entertainment system of claim 17, wherein said relationship between said sequence of different video images and said audio sounds comprises one or more of: correspondence in time between infrared signals and scene cuts, correspondence in time between infrared signals and motion, correspondence in time between infrared signals and video flashes, and absence of incoming infrared signals over a threshold time during which video images are displayed.

19. A method of processing video information, said method comprising:
- receiving an incoming moving video signal comprising a sequence of different video images and an incoming audio signal at a video display device from a video source;
- analyzing video images carried in said incoming moving video signal to determine a type of video associated with said incoming video signal, wherein said determining comprises detecting indicia of gaming video; and
- selecting, based on said analyzing, one of a gaming mode and a standard mode for producing a video output signal comprising a sequence of different video images; and
- producing a video output signal in accordance with the selected one of said gaming mode and said standard mode;
- wherein said producing comprises:
  - in a gaming mode, producing an enhanced sequence of moving images by executing a first set of processing tasks on the incoming moving video signal; and
  - in a standard mode, producing an enhanced sequence of moving video images by executing a second set of processing tasks on the incoming moving video signal, wherein said second set of processing tasks is larger than said first set of processing tasks, with relatively more delay.

20. The method of claim 19, wherein said analyzing said video images to determine said type of video associated with said incoming moving video signal further comprises detecting motion characteristics of said video images and determining said type of video based on a heuristic relating motion characteristics and types of video.

21. The method of claim 20, wherein said motion characteristics comprise one or more of: frequency of horizontal panning over time, frequency of vertical panning over time, level of correlation of image motion, frequency of scene cuts, zooming, and presence of pervasive static image areas.

22. The method of claim 19, wherein said analyzing said video images to determine said type of video associated with said incoming moving video signal comprises characterizing a relationship between said video images and audio sounds carried in said incoming audio signal and comparing said relationship with a heuristic relating audio-video relationships and types of video.

23. The method of claim 19, further comprising receiving incoming infrared signals at said display device from an infrared signal source; and said analyzing said video images to determine said type of video associated with said incoming moving video signal further comprises analyzing relationships between said video images carried in said incoming moving video signal and said incoming infrared signals.

* * * * *